United States Patent
Prejean et al.

(10) Patent No.: US 7,696,277 B2
(45) Date of Patent: Apr. 13, 2010

(54) LLDPE AND ETHYLENE VINYL ACETATE COPOLYMER THERMOPLASTIC BLEND

(75) Inventors: George Wyatt Prejean, Orange, TX (US); Stephen P. Musemeche, Orange, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 952 days.

(21) Appl. No.: 11/222,920

(22) Filed: Sep. 9, 2005

(65) Prior Publication Data

US 2010/0048796 A1    Feb. 25, 2010

Related U.S. Application Data

(60) Provisional application No. 60/608,387, filed on Sep. 9, 2004.

(51) Int. Cl.
 *C08L 23/08* (2006.01)
(52) U.S. Cl. .................. 524/522; 524/523; 524/524
(58) Field of Classification Search ............... 524/522, 524/523, 524
 See application file for complete search history.

(56) References Cited

U.S. PATENT DOCUMENTS

| | | | |
|---|---|---|---|
| 4,191,798 A | | 3/1980 | Schumacher et al. |
| 4,430,468 A | * | 2/1984 | Schumacher ............... 524/109 |
| 4,434,258 A | * | 2/1984 | Schumacher et al. ......... 524/13 |
| 4,851,463 A | | 7/1989 | Opsahl et al. |
| 6,319,969 B1 | | 11/2001 | Walther et al. |
| 6,723,793 B2 | | 4/2004 | Oswald et al. |
| 2002/0077401 A1 | | 6/2002 | Chaudhary et al. |

FOREIGN PATENT DOCUMENTS

| EP | 0 893 469 A1 | | 1/1999 |
|---|---|---|---|
| EP | 893469 A1 | * | 1/1999 |
| GB | 2 231 333 A | | 11/1990 |
| GB | 2231333 A | * | 11/1990 |

OTHER PUBLICATIONS

F. Cser, et al., Miscibility Studies on Cross-Linked EVA/LLDPE Blends by TMDSC, Journal of Thermal Analysis and Calorimetry, 2002, 651-662, vol. 70.

Genlin Wang, et al., Structure-Property Relationships of LLDPE-Highly Filled with Aluminum Hydroxide, Journal of Applied Polymer Science, 2002, 2485-2490, vol. 85.

* cited by examiner

*Primary Examiner*—Kelechi C Egwim

(57) ABSTRACT

The present invention provides a highly-filled thermoplastic composition comprising a linear low density polyethylene and an ethylene vinyl acetate copolymer. The thermoplastic composition exhibits high tensile strength, high flex modulus, high temperature resistance and high tear strength.

18 Claims, No Drawings

LLDPE AND ETHYLENE VINYL ACETATE COPOLYMER THERMOPLASTIC BLEND

CROSS REFERENCE TO RELATED APPLICATION

The present application claims priority under 35 U.S.C. §120 to U.S. Provisional Appln. No. 60/608,387, filed on Sep. 9, 2004, which is incorporated herein by reference in its entirety.

BACKGROUND OF THE INVENTION

1. Field of the Invention

The present invention relates to the field of thermoplastic polymeric compositions, and specifically to filled blends of the copolymers of ethylene and vinyl acetate.

2. Description of the Related Art

One or more patents and publications are cited in this description in order to more fully describe the state of the art to which this invention pertains. The entire disclosure of each of these patents and publications is incorporated by reference herein.

The practical applications of ethylene vinyl acetate (EVA) copolymers are diverse. For example, EVA copolymers are used in flexible shrink wrap, footwear soles, hot melt and heat seal adhesives, flexible toys, tubing, wire coatings, medical gloves, masks, automotive carpet, foam, fabric or scrim material, sound-dampening and the like.

Two parameters of EVA copolymers that affect their intended utility are the level of vinyl acetate comonomer and the melt index. At low comonomer levels, the EVA copolymer has a high degree of polyethylene crystallinity. As the percent of vinyl acetate increases, the vinyl acetate disrupts the polyethylene crystallinity and, accordingly, melting and freezing points decrease. A copolymer having a high melt index, which is correlated with a low molecular weight, is expected to be softer and have a lower melting temperature, for example. As the melt index decreases, the copolymer's properties also change, as expected for higher molecular weight polymers.

EVA copolymers have been blended with other polymers. For example, Cser et al. ((2002) *J. Therm. Anal. Calorim.* 70:651-662) describes the miscibility of a cross-linked ethylene vinyl acetate copolymer and linear low density polyethylene (LLDPE) blended with virgin LLDPE.

In addition, Wang et al. ((2002) *J. Appl. Polymer Sci.* 85:2485-2490) discloses that while EVA copolymer improves the processing and ductile properties of LLDPE highly loaded with aluminum hydroxide, there was a concomitant deterioration of the tensile strength.

U.S. Pat. No. 6,723,793 describes a foam blend comprising A) a heterogenous or homogeneous linear ethylene homopolymer or interpolymer; and B) a branched homopolymer or interpolymer.

U.S. patent application Ser. No. 10/003,639 describes a rotational molding composition comprising A) a majority component of one or more homopolymers or interpolymers such as a LLDPE, wherein the homopolymer or interpolymer is 70 percent or greater by weight of the composition; and B) one or more impact additives such as an ethylene-vinyl acetate copolymers (EVA) having a vinyl acetate content of about 2 to about 50 weight percent, wherein the impact additive is about 2 to about 50 percent of the molding composition; and wherein the impact strength of the composition at a fixed temperature is increased by at least 0.1 ft-lb/in from that of the majority component in the absence of the impact additive. The composition can also contain less than about 10 weight percent of filler.

SUMMARY OF THE INVENTION

The present invention is a thermoplastic composition comprising at least one ethylene vinyl acetate copolymer, at least one linear low density polyethylene, and at least one filler.

DETAILED DESCRIPTION OF THE INVENTION

The definitions herein apply to the terms as used throughout this specification, unless otherwise limited in specific instances. As used herein, the term "copolymer" refers to polymers containing two or more different monomers. The term "copolymer of various monomers" refers to a copolymer whose units are derived from the various monomers. The term "thermoplastic polymer" as used herein refers to a polymeric material that can be repeatedly softened by heating and hardened by cooling through a temperature range characteristic of the material and that in the softened state can be shaped into articles by flow, e.g., by molding or extrusion. The term "melt index", abbreviated "MI", refers to the mass rate of flow of a polymer through a specified capillary under controlled conditions of temperature and pressure.

The present invention provides a filled thermoplastic composition comprising a linear low density polyethylene blended with at least one ethylene vinyl acetate copolymer. The thermoplastic composition exhibits new and unique properties, namely good elongation, very high tensile strength, high flex modulus, high temperature resistance and high tear strength. The good elongation at break properties, namely greater than 350 percent, and improved physical properties are both a surprising and unexpected result of the present combination of linear low density polyethylene and EVA. Moreover, the addition of oil as a processing aid is generally not necessary to achieve these properties.

The composition of the present invention comprises at least one ethylene vinyl acetate copolymer and at least one linear low density polyethylene. As used herein, an ethylene vinyl acetate or EVA is defined as a copolymer of ethylene and vinyl acetate monomers. The choice of the EVA can vary depending on the degree of chemical resistance, elongation, flexibility, and other properties desired in the resulting thermoplastic. For example, as the proportion of the vinyl acetate comonomer in the copolymer increases, the elastomeric properties of the copolymer improve, as does the elongation; however, tackiness also increases.

Suitable EVA copolymers for use in the present invention include an EVA copolymer containing from about 25 to about 35 weight percent of vinyl acetate, or more suitably about 27 to about 32 weight percent of vinyl acetate. In particular embodiments, the EVA(s) employed have a total vinyl acetate content of about 29 weight percent of the EVA copolymer. Suitable EVA copolymers have a melt index of from about 0.1 to about 75, or more suitably about 3 to about 48, grams/10 minutes, as measured using ASTM D-1238. Further, particularly suitable EVA copolymers have densities greater than or equal to about 950 kg/m$^3$ at 23° C., measured according to ASTM D-1505.

In general, a composition of the present invention contains from about 1% to about 50% by weight of at least one EVA copolymer. In some preferred embodiments, the ethylene vinyl acetate copolymer content is about 15% to about 30% by weight of the composition of the present invention. In particularly preferred embodiments, the ethylene vinyl acetate copolymer content is about 23% by weight of the composition of the present invention.

As one of skill in the art can appreciate, the vinyl acetate content of the EVA of the thermoplastic composition of the present invention can be achieved via the use of a single EVA copolymer or via the use of a blend of two or more EVAs at appropriate ratios to achieve the desired total vinyl acetate content of the EVA.

To illustrate, when blending two EVAs to achieve the desired characteristics of a thermoplastic composition of the present invention, a first ethylene vinyl acetate copolymer can include from about 25% vinyl acetate to about 30% vinyl acetate, or more suitably about 28% vinyl acetate, based upon the weight of the first EVA copolymer, and can have a melt index of from about 1 gram/10 minutes to 10 grams/10 minutes. In some particularly preferred embodiments, the first EVA copolymer has a melt index from about 3 to about 7 grams/10 minutes. The first ethylene vinyl acetate copolymer may be present in the thermoplastic composition in an amount of from about 1% by weight to about 34% by weight, or more suitably from about 10% by weight to about 20% by weight. In some particularly preferred embodiments, the first ethylene vinyl acetate copolymer is about 15% by weight of the thermoplastic composition. Suitable EVA copolymers are commercially available under the tradenames ELVAX® from E.I. duPont de Nemours and Company (Wilmington, Del.) ("DuPont") and EVATANE™ from Atofina (Bayport, Tex.). Examples of suitable resins include, but are not limited to, ELVAX® 260 (VA 28%; MI 6.0), ELVAX® 265 (VA 28%; MI 3.0), EVATANE™ Grade 28-03 (VA 28%, MI 4.0), EVATANE™ Grade 28-05 (VA 28%; MI 7.0), and ATEVA™ 2803A (VA 28%, MI 3.0).

A second ethylene vinyl acetate copolymer can include from about 30% vinyl acetate to about 35% vinyl acetate, or more suitably about 32% to about 34% vinyl acetate, based upon the weight of the second EVA copolymer, and can have a melt index of from about 10 grams/10 minutes to 60 grams/10 minutes. In one embodiment, the second EVA copolymer has a melt index of from about 38 to about 48 grams/10 minutes. In some particularly preferred embodiments, the second EVA copolymer has a melt index of about 43 grams/10 minutes. The second ethylene vinyl acetate copolymer can be present in the thermoplastic composition in an amount of from about 1% by weight to about 34% by weight or, more suitably, from about 5% by weight to about 12% by weight. In some particularly preferred embodiments, the second ethylene vinyl acetate copolymer is about 8% by weight of the thermoplastic composition. Examples of suitable resins include, but are not limited to, ELVAX® 150 (VA 32%; MI 43), EVATANE™ Grade 33-25 (VA 32-34%, MI 22-29) and EVATANE™ Grade 33-45 (VA 32-34%; MI 38-48).

EVA copolymers suitable for use in the blends of the present invention may be synthesized according to any suitable means. For example, EVA copolymers may be partly or entirely polymerized in autoclave or tubular reactors at pressures above 14,500 psi (100 MPa) with the use of free-radical initiators.

As demonstrated herein, a linear low density polyethylene (LLDPE) blended with an EVA to produce a thermoplastic composition advantageously increases the tensile strength, flex modulus, temperature resistance and tear strength of the thermoplastic. In contrast, a low density polyethylene (LDPE) failed to impart these desirable characteristics in a thermoplastic composition containing an EVA, as defined herein.

LLPDEs suitable for use in the thermoplastic composition of the present invention have a density of about 0.910 g/cc to about 0.935 g/cc, or more suitably about 0.920 g/cc, and have a melt index of from about 0.1 gram/10 minutes to 5 grams/10 minutes, or more suitably 1 gram/10 minutes. In general, a composition of the present invention contains about 5% to about 25% by weight of at least one LLDPE. In one embodiment, the LLDPE is about 10% to about 20% by weight of the composition of the present invention. In some particularly preferred embodiments, the LLDPE is about 15% by weight of the composition. In general, increasing the content of LLDPE in the composition will increase its crystallinity.

A linear low density polyethylene can be prepared by any suitable process such as gas phase, solution, slurry, or tubular reactor in the presence or absence of a catalyst. Polyethylene polymers produced in this manner generally have high levels of short-chain branching. Suitable LLPDEs, including metallocene-catalyzed LLPDEs, are commercially available under the tradename DOWLEX™ from Dow Chemical Co. (Midland, Mich.) and EXCEED™ from Exxon-Mobil Chemical Corporation (Houston, Tex.). Examples of suitable resins include, but are not limited to, DOWLEX™ 2054 (Density 0.920 g/cm$^3$; MI 1.0) and EXCEED™ 1012CA (Density 0.912 g/cm$^3$; MI 1.0).

To modify the density of the thermoplastic composition of the present invention, one or more fillers are generally added. The percentage of filler that should be included in the composition on a weight basis is primarily a function of the density of the filler. Particle size and shape of the filler also will have an effect on properties of blends. For example, fine particle size fillers generally have a tendency to result in higher blend viscosities and are generally more expensive.

Examples of suitable fillers include, but are not limited to, calcium carbonates of natural or synthetic origin, magnesium carbonate, zinc carbonate, mixed salts of magnesium and calcium such as dolomites, limestone, magnesia, barium sulfate, calcium sulfate, magnesium and aluminum hydroxides, silica, wollastonite, clays and other silica-alumina compounds such as kaolins, silico-magnesia compounds such as talc, mica, solid or hollow glass beads, metallic oxides such as zinc oxide, iron oxides, titanium oxide, or mixtures thereof. Particularly suitable fillers include barium sulfate (bulk density 600-1,600 kg/m$^3$), calcium carbonate (bulk density 300-600 kg/m$^3$), or a combination thereof.

The amount of filler(s) added to a thermoplastic composition of the present invention is generally from about 40 to about 80% by weight, or from about 50 to about 70% by weight. In some preferred embodiments, the level of filler(s) is about 61%. In one embodiment, a filler can be prepared by blending calcium carbonate and barium sulfate in a 1:2 ratio such that the total content of filler is within the ranges set forth herein.

While the new and unique properties of the thermoplastic composition of the present invention may be achieved without the addition of oil as a processing aid, the filled thermoplastic composition of the present invention can contain one or more other additives to obtain desired effects such as a reduction of cost or an enhancement of a physical property. Accordingly, suitable processing aids, such as monomeric organic acids, for example stearic acid or a metal salt thereof; stabilizers such as antioxidants, ultraviolet ray absorbers, and hydrolytic stabilizers; plasticizers such as polyethers or polyether esters; tackifiers, such as known hydrocarbon tackifiers; waxes, such as polyethylene waxes; colorants or pigments (e.g., carbon black); optical brighteners; surfactants; antistatic agents; fire retardants; lubricants; reinforcing agents such as glass fiber and flakes; antiblock agents; release agents; and/or mixtures thereof can be added to the extent that they do not interfere with the desired physical properties of the filled thermoplastic composition of the present invention. The additives are employed in functionally equivalent amounts known to those skilled in the art, generally in amounts of up to about 10%, or from about 0.01% to about 5%, or in particular from about 0.1% to about 0.6% percent by weight, based upon the total weight of the filled thermoplastic composition.

In accordance with the teachings provided herein, an example of a highly-filled (61% by weight) thermoplastic composition containing a linear low density polyethylene at 15% by weight and ethylene vinyl acetate (VA 29%) at 23.3% by weight of the thermoplastic composition was produced. This composition was found to have a very high tensile strength (in the range of 700 psi to 1100 psi), a high temperature resistance (a melting temperature above 120° C.), a high flex modulus (in the range of 30,000 to 35,000 psi), a high tear strength (in the range of 200 to 300 lbf/in), and a good elongation at break (e.g., greater than 350%).

The teachings herein provide several different polymeric ingredients and their individual contribution to a thermoplastic composition of the present invention. However, as will be apparent to one of skill in the art, polymeric ingredients of the above types can be further formulated. For example, the compounder can elect to modify a simple three-component composition (e.g., an EVA/a LLDPE/a filler) by replacing a portion of the EVA with a small amount of a tackifier for improved adhesion. Thus, there are many possible combinations and permutations available to the skilled compounder that remain within the spirit and intent of this invention.

The blends of the present invention are generally not covalently cross-linked or cured, unless desired during end-product production. Further, these blends are thermoplastic in nature and therefore can be recycled after processing. The recycled material can also contain textile fibers, jute, etc., that may be present in the trim obtained during production of the finished product (e.g., automotive carpet backing).

A commercially sized batch-type Banbury or equivalent intensive mixer is suitable for preparing the compositions of the present invention. A Farrel continuous mixer (FCM) is also a suitable mixing device. In either instance, dry ingredients are charged in routine fashion. If desired, the EVA and LLDPE polymers can be precompounded as a pellet blend or as a masterbatch in a suitable intensive mixing device (e.g., Banbury mixer or screw extruder). This masterbatch can then be compounded with the filler and the other remaining ingredients to produce the final composition. A mix cycle of about 3 minutes is generally adequate for the Banbury mixer at an operating temperature ranging typically from about 325° F. to about 375° F. The operating rate for the FCM unit generally will fall within ranges predicted by literature prepared by the Farrel Company of Ansonia, Conn. Here, temperatures ranging typically from about 325° F. to about 425° F. are generally effective. While not evaluated, it is expected that other devices for handling viscous mixes (MI of 0.1 to 60) should perform in an entirely satisfactory manner.

Once the thermoplastic composition of the invention is blended, routine commercial practices can be used, such as underwater melt-cutting plus drying or use of sheeting plus chopping methods, to produce a final composition in pellet form. Alternately, the hot mixture also can be immediately fabricated into a final form, e.g. sheeting, molding, extrusion, casting, etc.

The highly-filled compositions described herein can be processed industrially into final sheet, film or three-dimensional solid form by using standard fabricating methods well known to those skilled in the art. Thus, fabricating methods such as extrusion, calendering, injection or rotomolding, extrusion coating, sheet laminating, sheet thermoforming, etc. are all practical means for forming the compositions of this invention.

The blends of the present invention can readily be extruded onto a substrate, such as automotive carpet, foam, fabric or scrim material, or can be extruded or calendered as unsupported film or sheet according to standard methods. Depending upon the equipment used, and the compounding techniques employed, it is possible to extrude a wide range of film thickness, from below 20 mils to above 100 mils.

In view of the improved characteristics of the thermoplastic composition of the present invention (e.g., high tensile strength, high flex modulus, high temperature resistance, high tear strength, and good elongation), this composition will be useful in the sheeting field, particularly for low cost, dense, sound-deadening structures. A moldable sound barrier can be used in sound deadening applications including transport systems such as automobiles, motorcycles, buses, tractors, trains, trams, airplanes, and the like. When applied to automotive carpet, blends described herein are an effective and economic means to deaden sound, while also simultaneously serving as a moldable support for the carpet. For example, the thermoplastic composition of the present invention can be bonded to a top coating, such as Advantech™ 8800D ethylene elastomer, to form a flooring system for the automotive industry. The application of the compositions of the present invention in carpets, and particularly in automotive carpets, is essentially identical to methods already described in U.S. Pat. No. 4,191,798.

When used in sheet form, especially when coated onto a fabric, the blends can be installed in other areas of an automobile, truck, bus, etc., such as side panels, door panels, roofing areas, headliners and dash insulators. The compositions of this invention may also be used in automotive door and truck liners, rear seat strainers, wheel well covers, carpet underlayments, dash mats, sound damped automotive enclosures such as oil pans, disc brake pads, mufflers, etc.

In sheet form, the highly-filled blends can also be used as drapes or hangings to shield or to surround a noisy piece of factory equipment such as a loom, a forging press, conveyor belts and material transfer systems, etc.

The compositions of this invention can further be used for sound deadening in small and large appliances, including dishwashers, refrigerators, air conditioners, and the like; household items such as blender housings, power tools, vacuum cleaning machines, and the like; lawn and garden items such as leaf blowers, snow blowers, lawn mowers, and the like; small engines used in boating applications such as outboard motors, water-jet personal watercraft, and the like. Additional applications include devices for modifying the sound of a drum, loudspeaker systems, acoustically damped disc drive systems, and the like.

In construction and building industries, compositions of this invention can be used as wallpapers/coverings, composite sound walls, thermoformable acoustical mat compositions, vibration-damping constrained-layer constructions, and sound insulation moldable carpets. In laminated sheet form, the blends, faced with another material, can be used to achieve both a decorative and a functional use, such as dividing panels in an open-format office. An advantage of the blends of this invention is that certain physical properties, such as flexibility and toughness, which are typically reduced when fillers are added to polymers, can be maintained within useful limits over a broad range of filler concentrations. Thus, blends of this invention could be used in the manufacture of wire and cable components in a variety of electronic, telecommunications and similar areas, of various molded parts, of sealants and caulks, or in other uses where flexibility, toughness and heat resistance and better thermal stability are desired, coupled with the economies normally achieved by the incorporation of low cost fillers.

The following Example is presented to more fully demonstrate and further illustrate various aspects and features of the present invention. As such, the Example is not intended to limit the scope of the invention in any way.

Example

Polyethylene-Containing Thermoplastics

Analytical Methods.

Ingredients used in the following example were mixed according to standard methods disclosed herein. All parts and percentages are by weight unless otherwise specified. Mix conditions used were fluxing for 3 minutes, at a temperature ranging from about 325° F. to about 375° F. (from about 160° C. to about 190° C.).

Melt Index (MI) was measured according to ASTM D-1238, with values of MI reported in grams/10 minutes. Density, DSC melting point (centigrade degrees), flex modulus (psi), ultimate tensile strength (psi), shore A hardness, and tear strength were determined in accord with ASTM D-792, ASTM D-3418, ASTM D-790, ASTM D-638, ASTM D-2240, and ASTM D-624, respectively.

Materials.

EVAL: Ethylene vinyl acetate copolymer (ELVAX® 150, available from E.I. du Pont de Nemours & Co. of Wilmington, Del. (DuPont)), 32% by weight of vinyl acetate, MI of 43 g/10 minutes, density of 957 kg/m³, and melting point of 63° C.

EVA2: Ethylene vinyl acetate copolymer (ELVAX® 260, available from DuPont), 28% by weight of vinyl acetate, MI of 6 g/10 minutes, density of 955 kg/m³, and melting point of 75° C.

Linear low density polyethylene (Dowlex™ 2045, available from the Dow Chemical Company of Midland, Mich.) having an MI of 1.0 g/10 minutes, density of 0.92.0 gm/cc, and DSC melting point of 122° C.

Stearic Acid (octadecanoic acid, $CH_3(CH_2)_{16}$—COOH) molecular weight of 284.49, density 0.94 g/cm³, melting point of 70° C., commercial grade available under the trade name Industrene™ B from the Chemtura Corporation of Middlebury, Conn. (formerly the Crompton Corporation).

Carbon black dispersed in polyethylene, used as a colorant, available under the tradename PolyOne™ 2447 from the PolyOne Corporation of Avon Lake, Ohio.

Barium sulfate, filler, molecular weight of 233.39, density 4.3 g/cm³ at 20° C., decomposition temperature of about 1600° C., commercial grade.

Calcium carbonate, filler, molecular weight of 100.9, density 2.93 g/cm³, decomposition temperature of about 825° C., commercial grade.

KELDAX® 6868, available from DuPont, low fog filled thermoplastic polymer, <25% EVA, 55-60% barium sulfate, <25% calcium carbonate, and <0.5% carbon black.

Table 1 lists the ingredients and proportions (in % by weight) thereof used of an exemplary EVA and LLDPE thermoplastic composition (KELPE™ 1066).

TABLE 1

KELPE™ 1066 COMPOSITION

| Ingredient | Amount, wt % |
| --- | --- |
| EVA1 | 8.00 |
| EVA2 | 15.30 |
| LLDPE | 15.00 |
| Stearic Acid | 0.30 |
| Calcium Carbonate | 20.00 |
| Barium Sulfate | 41.00 |
| Carbon Black Concentrate | 0.40 |

Table 2 demonstrates that the addition of a linear low density polyethylene to an EVA copolymer improves many of the physical properties of the EVA. For example, the KELPE™ 1066 exhibited increased tensile strength, melt point temperature, tear strength and flex modulus compared to the KELDAX® 6868, while maintaining a comparable hardness and a mean break elongation greater than 350%.

TABLE 2

COMPARISON OF PHYSICAL PROPERTIES

| Property | KELDAX ® 6868 | KELPE ™ 1066 |
| --- | --- | --- |
| Mean Break Elongation (%) | 500 | 371 |
| Mean Tensile Strength (psi) | 350 | 914 |
| DSC Melt (° C.) | <80 | 124 |
| Melt Index | 3.5 | 1.8 |
| Shore A | 93 | 94 |
| Flex Modulus (psi) | 12970 | 31211 |
| Tear Strength (lbf/in) | 115 | 248 |

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A thermoplastic composition consisting of:
   (a) at least two ethylene vinyl acetate copolymers in an amount of about 1 to about 50 wt %, said at least two ethylene vinyl acetate copolymers selected from the group consisting of:
      (i) a first ethylene vinyl acetate copolymer having a first melt index in the range of from about 1 to about 10 g/10 min and consisting of copolymerized ethylene and a first content of copolymerized vinyl acetate comonomer in an amount of about 25 to about 35 wt % based on the total weight of the first ethylene vinyl acetate copolymer; and
      (ii) a second ethylene vinyl acetate copolymer having a second melt index in the range of about 38 to about 48 g/10 min and consisting of copolymerized ethylene and a second content of copolymerized vinyl acetate comonomer in an amount of about 30 to about 35 wt %, based on the total weight of the second ethylene vinyl acetate copolymer;
   wherein the at least two ethylene vinyl acetate copolymers comprise at least one first ethylene vinyl acetate copolymer and at least one second ethylene vinyl acetate copolymer;
   (b) at least one linear low-density polyethylene in an amount of about 10 to about 20 wt %; and
   (c) at least one filler in an amount of about 40 to about 80 wt %;

wherein the amounts of ethylene vinyl acetate copolymers, linear low-density polyethylene and filler are weight percentages (wt %) based on the total weight of the thermoplastic composition.

2. The thermoplastic composition of claim 1, wherein the first content of copolymerized vinyl acetate comonomer is in the range of about 25 to about 30 wt %.

3. The thermoplastic composition of claim 1, wherein the first melt index is from about 3 to about 7 g/10 min.

4. The thermoplastic composition of claim 1, wherein the first ethylene vinyl acetate comonomer is present in the thermoplastic composition in an amount of about 1 to about 34 wt %.

5. The thermoplastic composition of claim 1, wherein the first ethylene vinyl acetate comonomer is present in the thermoplastic composition in an amount of about 10 to about 20 wt %.

6. The thermoplastic composition of claim 1, wherein the second content of copolymerized vinyl acetate comonomer is in the range of about 32 to about 34 wt %.

7. The thermoplastic composition of claim 1, wherein the second ethylene vinyl acetate comonomer is present in the thermoplastic composition in an amount of about 1 to about 34 wt %.

8. The thermoplastic composition of claim 1, wherein the first ethylene vinyl acetate comonomer is present in the thermoplastic composition in an amount of about 5 to about 12 wt %.

9. An article comprising the thermoplastic composition of claim 1.

10. The article of claim 9, wherein a sound-deadening structure comprises the thermoplastic composition.

11. The article of claim 10, wherein the sound-deadening structure comprises a carpet having a backing, and the backing of the carpet is at least partially coated with the thermoplastic composition.

12. The article of claim 10, wherein the sound-deadening structure comprises a sheet, a drape, or a hanging.

13. The article of claim 12, wherein the sheet is coated onto a fabric.

14. A vehicle wherein a side panel, a door, a door panel, a truck liner, a rear seat strainer, a wheel well cover, a carpet underlayment, a dash mat, an oil pan, a disc brake pad, a mufflers, a roofing area, a headliner or a dash insulator comprises an article of claim 12.

15. The article of claim 10, selected from the group consisting of a dishwasher, a refrigerator, an air conditioners, a blender housing, a power tool, a vacuum cleaning machine, a leaf blower, a snow blower, a lawn mower, a small engines, a device for modifying the sound of a drum, a loudspeaker system, or an acoustically damped disc drive system, a wallpaper, a wall covering, a composite sound wall, a thermoformable acoustical mat, a vibration-damping constrained-layer construction, a sound insulation moldable carpets, a dividing panel for an open-format office, a wire or cable, a molded part, a sealant and a caulk.

16. The article of claim 9, being a sheet or a film.

17. The article of claim 9, wherein the composition is extruded onto a substrate.

18. The article of claim 7, wherein the substrate is selected from the group consisting of carpet, foam, fabric and scrim material.

* * * * *